United States Patent [19]
Gras

[11] 3,785,900
[45] *Jan. 15, 1974

[54] METHOD OF MOLDING PLASTICS TO THE SURFACE OF A BACKING MATERIAL IMITATIVE OF LEATHER, FABRICS AND THE LIKE

[75] Inventor: Elie Gras, Thonon, France

[73] Assignee: Etablissements Anver S.A., Paris, France

[ * ] Notice: The portion of the term of this patent subsequent to Dec. 5, 1989, has been disclaimed.

[22] Filed: Aug. 25, 1971

[21] Appl. No.: 174,818

Related U.S. Application Data
[63] Continuation-in-part of Ser. No. 57,170, July 22, 1970, Pat. No. 3,705,071.

[30] Foreign Application Priority Data
Feb. 25, 1972  France ................... 69.2096624

[52] U.S. Cl. ............... 156/245, 156/209, 156/219, 264/257
[51] Int. Cl. .............................................. B29b 3/00
[58] Field of Search ............ 156/209, 219, 220, 156/242, 243, 245, 272, 273, 274, 275; 264/45, 119, 136, 137, 241, 244, 245, 257, 261, 319, 321, 324, 327; 161/116, 118, 124, 164, 247, 254, 256

[56] References Cited
UNITED STATES PATENTS

| | | | |
|---|---|---|---|
| 3,467,976 | 9/1969 | Jones | 264/257 X |
| 3,607,600 | 9/1971 | Schreter et al. | 156/245 X |
| 3,574,021 | 4/1971 | Van Buskirk | 156/209 |
| 3,170,832 | 2/1965 | Wilson et al. | 156/245 X |
| 3,361,610 | 1/1968 | Hannes | 156/219 |
| 3,473,990 | 10/1969 | Simon et al. | 264/257 X |
| 3,594,245 | 7/1971 | Hayes | 156/245 X |

Primary Examiner—Daniel J. Fritsch
Assistant Examiner—Caleb Weston
Attorney—Robert T. Gammons

[57] ABSTRACT

A method of making parts of shoes and articles of wearing apparel of conventional materials such as leather and splits thereof, woven and non-woven fibrous materials, synthetic materials and the like to provide a surface configuration corresponding to a master pattern which desirably is to be imitated, comprising confining a layer of compressible absorbent material and a base plastic between a backing layer of which the part is to be comprised and a mold containing a cavity embodying the surface configuration to be reproduced on the surface of the backing layer, applying pressure and heat to cause the compressible absorbent material and the base plastic to become integrated with the backing layer, allowing the plastic to stabilize and stripping the composite structure from the mold.

According to the method the compressible absorbent material may be in the form of a batt of thermoplastic fibers or foam and the base plastic may be a thermoplastic in liquid, paste, sheet or solid dry blend form. Desirably, a thin layer of dissolved plastic or plastic monomer is sprayed on the surface of the mold cavity prior to disposition of the base thermoplastic and compressible absorbent layer between the backing layer and the mold and optionally a pigmented plastic may be deposited in the mold cavity at predetermined areas. The mold is prepared by casting a material having a lower dielectric constant than the plastic employed on a master pattern embodying the configuration to be imparted to the backing layer and preferably the aforesaid material of the mold is silicone rubber.

21 Claims, 12 Drawing Figures

METHOD OF MOLDING PLASTICS TO THE SURFACE OF A BACKING MATERIAL IMITATIVE OF LEATHER, FABRICS AND THE LIKE

This application is a continuation-in-part of my U.S. Pat. No. 3,705,071.

BACKGROUND OF THE INVENTION

Preparing materials with a surface configuration imitative of a master pattern is not new, one method being to prepare from a master pattern embodying the configuration desired a mold comprised of silicone rubber, fill the mold with a base plastic material, place a backing layer of suitable material over the face of the mold and then by application of pressure and high-frequency heating melt the base plastic material to conform it to the mold and effect curing and integration thereof to the backing layer. One of the problems in carrying out the aforesaid method is that during the melting and curing stage, bubbles develop as a consequence of the rapid evaporation of the plasticizer or other substances contained in the base plastic material and these become localized principally at the surface which obviously spoils the appearance of the resulting composite structure and article manufactured therefrom and so must be rejected.

According to this invention the formation of bubbles at the surface may be effectively eliminated by introducing an absorbent compressible layer along with the base plastic between the mold and the backing sheet.

SUMMARY OF INVENTION

As herein illustrated, the method comprises confining a layer of compressible absorbent material and a base plastic material between the backing layer of which the part is to be made and a mold embodying the surface configuration to be reproduced, applying pressure and heat to cause the compressible absorbent layer and base plastic to become integrated and adhere to the face of the backing layer, allowing the plastic to stabilize and stripping the composite structure from the mold. The mold is comprised of a material having a lower dielectric constant than the plastic material and preferably is comprised of silicone rubber. The compressible absorbent layer may be in the form of a batt of thermoplastic fibers or foam. The base plastic material may be in liquid, paste, sheet or dry blend form. Optionally, a second layer of compressible absorbent material other than plastic may be interposed between the compressible thermoplastic absorbent layer and the backing layer for the purpose of reinforcement if desired. The base plastic material, in the form of PVC plastisol according to one procedure, is deposited in the mold cavity with the compressible absorbent thermoplastic layer placed over the plastisol within the cavity. Alternatively, the compressible absorbent layer is impregnated with the base plastic in liquid, paste or powder form or may comprise a skin foam plastic sheet. Desirably, a thin layer of plastic which may be dissolved thermoplastic such as polyurethane is sprayed on the surface of the mold cavity prior to disposition of the base plastic and the compressible absorbent thermoplastic material between the backing layer and the mold and optionally pigmented thermoplastic, liquid or paste may be deposited in the bottom of the cavity at predetermined areas to impart one or more different colors to specific areas of the composite structure.

The invention is not limited to thermoplastics but may be practiced with multi-part catalytic or heat curable materials such as multi-part polyurethane compounds or heat curing materials such as synthetic elastomers.

The invention will now be described in greater detail with reference to the accompanying drawings wherein.

Figure 5A:
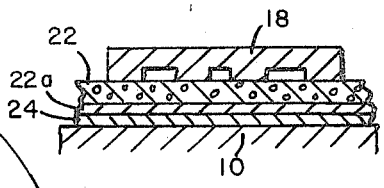
FIG. 5a is a view similar to FIG. 4 showing a reinforcing layer.
Figure 5B:
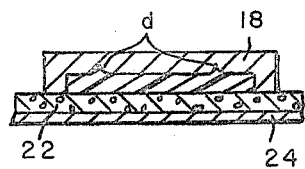
FIG. 5b is a view similar to FIG. 5 showing a mold embodying dents representing stitching with pigmented plastic smeared in the detents.
Figure 4:
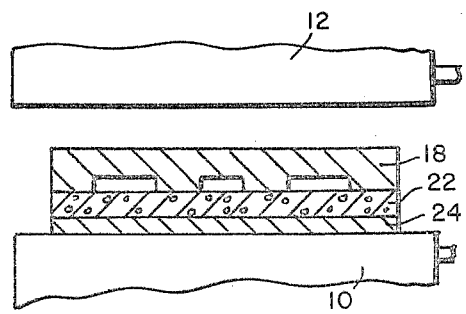
FIG. 4 is a view similar to FIG. 1 wherein the backing layer is supported by the lower fixed platen of the press, the compressible absorbent layer impregnated with a base plastic is disposed thereon and the mold is placed in an inverted position on top of the compressible absorbent layer.
Figure 5:
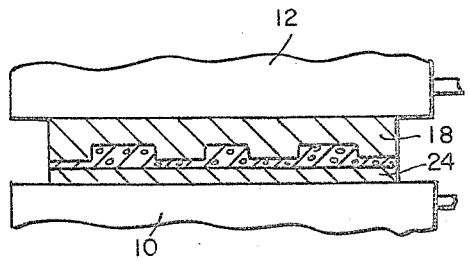
FIG. 5 is a view similar to FIG. 4 showing the integrated structure following the application of pressure and heat.
Figure 6:
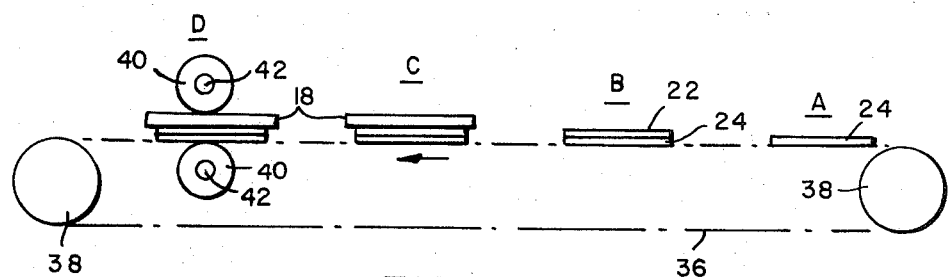
Figure 7:
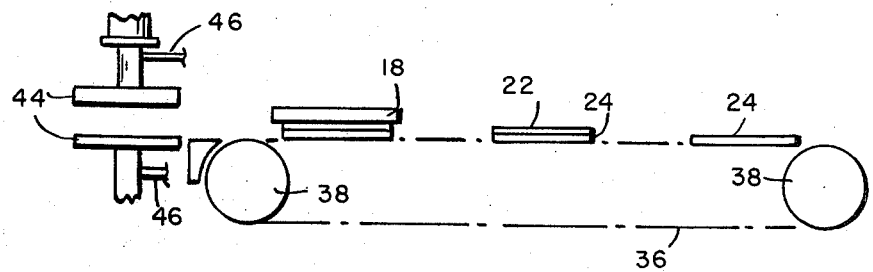
Figure 8:
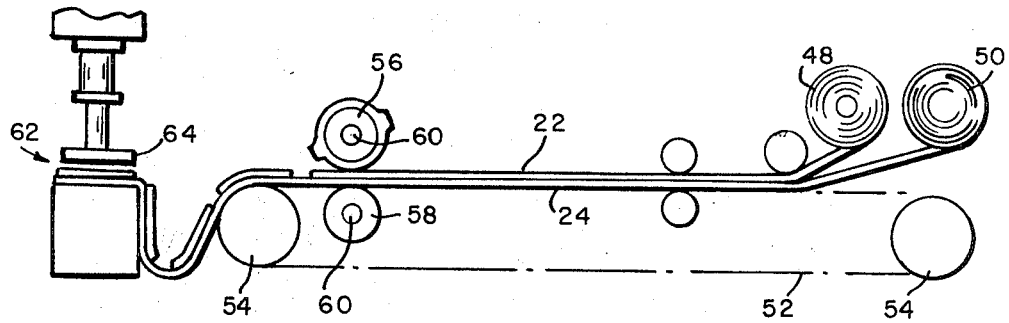

FIG. 6 diagrammatically illustrates an apparatus for carrying out the method as disclosed in FIGS. 4 and 5;

FIG. 7 diagrammatically illustrates an alternative apparatus for practice of the method of FIGS. 4 and 5; and FIG. 8 shows still another apparatus for carrying out the method in either of its forms wherein the backing layer and the compressible absorbent material are supplied in continuous lengths from coils thereof.

Figure 1:
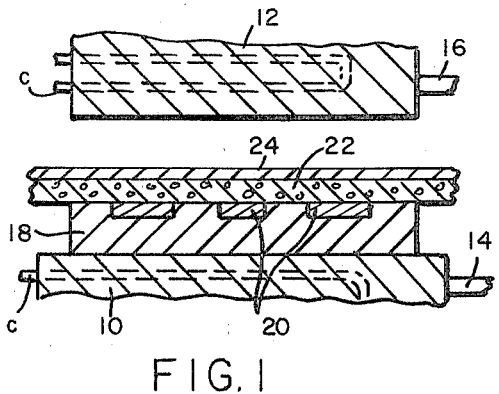
FIG. 1 is an elevation, partly in section, showing a mold resting upon the lower fixed platen of a press with the mold cavity filled with a base plastic and overlaying layers of a compressible absorbent material and a backing layer.
Figure 2:
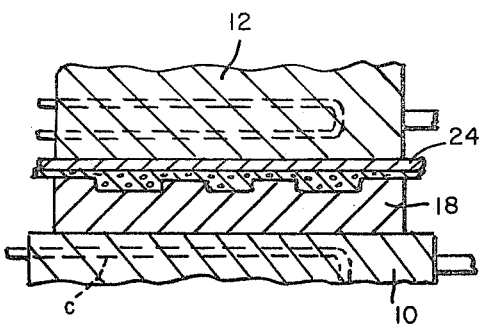
FIG. 2 is an elevation similar to FIG. 1 showing the integrated structure by application of pressure and heat.

Referring to FIGS. 1 and 2, the apparatus for carrying out the method comprises a press having a lower fixed platen 10 and upper movable platen 12 movable toward and away from the fixed platen, the platens being connected by suitable conductors 14 and 16 to a high-frequency generator and a mold 18 which is adapted to be placed between the platens.

The press platens may be provided with cored cooling passages $c$ to keep them at a low enough temperature to dissipate the heat employed in effecting integration of the component parts of the structure as will appear hereinafter.

The mold 18 is prepared by casting on a model or master pattern embodying the surface configuration which is to be reproduced a material having a lower dielectric constant than that of the material of the part to be molded. Preferably silicone rubber or a silicone containing material is used because it affords mold detail, is not affected by the temperature and does not require the use of releasing agents.

According to the preferred method, the mold 18 is placed cavity up on the fixed platen 10, as shown in FIG. 1, and the mold cavity filled with a base plastic 20. A layer of compressible absorbent material 22 is placed over the face of the mold so as to confine the plastic in the mold cavity and a backing layer 24 of the material which is to receive the impression of the mold is placed over the absorbent layer 22. The upper platen 12 is then lowered to apply pressure to the assembly and simultaneously a high-frequency field is induced between the platens to effect melting, integration of material and stabilization of the plastic. As a consequence of the pressure and heat the compressible absorbent layer 22 is crushed substantially completely by the face and bottom of the mold and along with the plastic takes the shape of the mold impression as shown in FIG. 2.

During the compression steps the plastic materials constituted by the compressible plastic absorbent layer and the fluid base plastic deposited in the mold cavity are melted by the high-frequency current and become integrated and firmly bonded to the backing layer, forming a homogeneous structure on the surface of the backing layer 24 embodying the surface configuration of the mold. The compressible absorbent layer 22 may be a plastic which has a higher melting point than the base plastic or a woven or non-woven material comprised of synthetic or natural fibers and thus a reinforcement as well as a means for dissipating bubbles. As related in my Pat. No. 3,705,071, both the absorbent layer and the base plastic are comprised of PVC or an equivalent plastic.

During the curing step any bubbles which develop as a consequence of rapid evaporation of the plasticizer or other substances contained in the plastic material are allowed to escape laterally through the porous structure or be absorbed into the compressible absorbent layer and so do not appear on the surface of the finished part. The absorbent compressible layer has the further advantage in that it provides in conjunction with the backing layer of gasket which restricts exit of any excess plastic which may tend to flow laterally from the mold cavity as a result of the application of molding pressure thus insuring sufficient volume of the plastic in the mold cavity to provide fine reproduction of the detail of the mold cavity.

The absorbent compressible layer 22 is thus extremely advantageous in that it holds the thermoplastic before and during the application of pressure and facilitates the dissipation of any bubbles produced during the curing step.

Figure 2A:
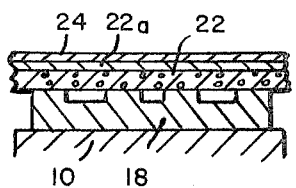
FIG. 2a is an elevation similar to FIG. 1 showing a reinforcing layer.

To provide for greater mechanical strength in the end product a second reinforcing layer 22a (FIG. 2a) of compressible absorbent material may be interposed between the absorbent layer 22 and the backing layer 24. This second layer 22a is desirably comprised of a material of different chemical composition and dielectric properties than that of the layer 22 so that it will not melt at the temperature employed in effecting integration of the structure. This layer may be comprised of, for example, leather, leather splits, leather board, woven or non-woven fibrous material, Fiberglas, rubber and the like.

Figure 2B:
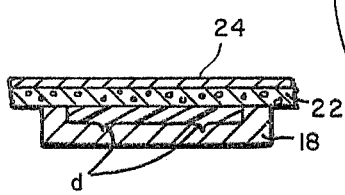
FIG. 2b is a view similar to FIG. 1 showing a mold embodying dents representing stitching with a pigmented plastic smeared in the detents.

According to a preferred embodiment of the invention a thin surface layer of dissolved plastic is sprayed on the surface of the mold cavity prior to depositing the base plastic 20 in the mold cavity. For example, dissolved thermoplastic polyurethane is used for the purpose of imparting an acceptable and durable surface finish and also as a means of introducing color by inclusion of pigments or dyes. The sprayed plastic layer must, of course, be compatible with the base plastic to be deposited in the mold cavity. Optionally, a pigmented plastic of a different color may be deposited at the predetermined parts of the mold prior to the application of the spray-coated material. Thus, for example, as shown in FIG. 2b if the bottom of the mold cavity contains detents $d$ representing stitching these may be filled with a pigmented plastic by smearing the plastic into the detents and then wiping the surface clean. During the application of the molding pressure and high-frequency current both the thin spray coating of plastic and the pigmented plastic melt and become integrated with the base plastic of the structure so as to impart a desired overall or local coloring thereto. Introducing the color in this fashion provides for sufficient bonding to insure permanence.

By suitably forming the mold with depressions and elevations, it is possible to provide for decorative elements on the surface of the backing layer in the form of raised or depressed areas such as seams, appliques, stitching, cut-outs and the like.

As thus described, the backing layer 24 and the compressible absorbent layer 22 are comprised of pieces of larger area than the mold so that after the molding operation and integration of the layers the integrated structure is trimmed to the configuration of the part for which it is intended. Optionally, both of the layers 22 and 24 may be precut to the configuration of the inside of the mold cavity so as to require no trimming.

Figure 3:
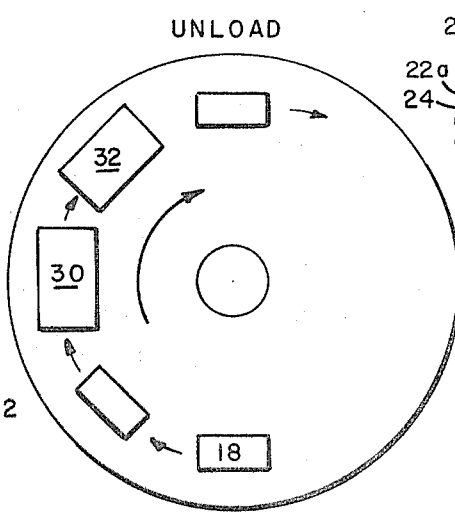
FIG. 3 is a plan view diagrammatically illustrating apparatus by means of which the method of FIGS. 1 and 2 may be carried out.

The aforesaid method may be carried out continuously for production purposes, as shown in FIG. 3, with apparatus comprising two presses 30 and 32 having superposed upper and lower platens and a rotary table 34 arranged to turn in a horizontal plane about a vertical axis to carry molds placed upon its surface between the platens of the presses. In the first press 30 molding pressure and high-frequency heating is applied to effect integration of the component part as related above. The table is then stepped around to move the mold and integrated structure from the press 30 to the second press 32 where the integrated structure is held under pressure until it cools, the latter press being provided for this purpose with cooling passages $c$ as related above. After cooling the composite structure is stripped from the mold and if the structure was made of larger size than the mold it is trimmed to size. If the parts on the other hand were precut to size, the integrated structure will, of course, be in suitable form for use. It is to be understood that the second press may be omitted and the cooling effected by providing the first press with cooling passages.

Alternatively, as shown in FIGS. 4 and 5, the method may be practiced by placing the backing layer 24 on the lower fixed platen 10, depositing the compressible absorbent layer 22 impregnated with a base plastic on the backing layer 24 and then applying molding pressure and heat by pressing the mold 18 downwardly against the upper surface of the compressible absorbent layer 22. The compressible absorbent layer 22 is pre-impregnated with a base plastic in liquid, paste (semisolid) or powder form and must be compatible and bondable with the absorbent layer 22. During the application of pressure and the high-frequency heating the materials comprising the compressible absorbent layer and the impregnant or base plastic become completely integrated, forming on the face of the backing layer 24 a homogeneous structure, the surface of which corresponds in configuration to the mold. As related above, any bubbles which develop during the melting and curing are dissipated by means of the absorbent layer and, as previously related, the latter restricts the flow of excess plastic from the mold cavity during the application of molding pressure. As also previously related, to provide for greater mechanical strength of the end product a second layer 22a of compressible absorbent material may, if desired, be interposed between the layer 22 and the layer 24 as shown in FIG. 5a. As also related above, it may be desirable to apply a spray coating of liquid plastic to the surface of the mold cavity and/or deposit pigmented plastic in predetermined areas thereof (FIG. 5b), for example stitch dent d, prior to the application of molding pressure and heating to the layers 22 and 24.

Instead of using a compressible absorbent layer impregnated with a thermoplastic material, a skin foam thermoplastic sheet material may be employed placed face down with the skin side against the face of the mold. The backing material 24 is superposed on the back side of the skin foam and when the molding pressure and heating are applied the skin is reformed to the detail of the mold surface and becomes integrated to the backing layer. Skin foam PVC is suitable for this purpose and it may be precut to the configuration of the mold prior to use. The backing layer 24 may also be precut and may comprise any of the materials referred to above. Preferably the backing layer is coated with an adhesive or a film of adhesive die-cut to size is disposed between the foam side and the backing layer.

Apparatus for carrying out the method shown in FIGS. 4 and 5 may comprise, as shown in FIG. 6, a conveyor belt 36 mounted on spaced sheaves 38—38 driven continuously in the direction of the arrow a. At a first station A, the backing layer 24 is deposited on the belt from whence it moves to a second station B where the layer of compressible absorbent material 22, which has been previously impregnated with plastic, is deposited upon the backing layer 24. The layers 22 and 24 travel from the station B to a station C where the mold 18 is placed face down on the layers and from thence the assembly moves to station D where pressure is applied between a pair of superposed pressure applying rollers 40-40. A high-frequency current is appied through the rollers which, for this purpose, are provided with terminals 42-42 which in turn are connected to a high-frequency generator.

Alternatively, the method may be carried out as shown in FIG. 7 by replacing the pressure applying rollers 40-40 with pressure applying platens 44-44 connected by terminals 46-46 to a high-frequency generator.

Optionally, as shown in FIG. 8, layers 22 and 24 may be supplied in strip form from coils 48 and 50, the layers of sheet material being carried along in superposed relation by a conveyor belt 52 supported by sheaves 54-54 and moved continuously between a roller 56 which has on its surface the configuration to be imparted to the layer 22 and a supporting roller 58. The roller 56 is covered with silicone rubber or equivalent material bearing the impression which is to be applied to the layer 22 and the two rolls are connected by suitable terminals 60 to a high-frequency generator so that as the assembly passes between the rollers, the impregnated compressible absorbent layer is crushed and becomes integrated with the backing layer. The integrated structure is moved onto a press 62 provided with cutting dies 64 adapted to cut it between the molded areas.

According to the invention, the layer of compressible absorbent material and the base plastic, whether the latter is deposited in the cavity or is impregnated into the absorbent layer, comprises, when melted, a volume which is greater than the volume of the mold cavity to insure intimate conformance to the configuration of the cavity. Additionally, the plastic material comprising the thin coating sprayed on the mold surface, the compressible absorbent layer and the base plastic disposed in the mold cavity or contained in the compressible absorbent layer and any pigmented plastic employed must be compatible so that they become completely integrated, forming a homogeneous facing which bonds firmly to the backing layer.

The method described herein is particularly advantageous for manufacturing relatively thin parts, for example articles or objects having a thickness in the order of 0.02 inches to 0.12 inches for producing components which, in turn, may be used to manufacture shoes and other articles for which leather is normally used and for imitating the weave and pattern of various textile materials and products. However, it is to be understood that, if desired, it is applicable to manufacture thicker articles.

One of the particular advantages of this invention is the capability of providing plastic in certain areas with greater or lesser amounts of plasticizer than other areas so that after integration the end product comprises, on the one hand, soft and flexible portions corresponding to the areas containing the higher percentage of plasticizer and, on the other hand, more rigid portions in the areas containing the lower percentage of plasticizer. This particular aspect of the invention further increases the general use of the method since it permits manufacturing the parts having more rigid zones associated with flexible zones. Thus the method permits making, in a single operation, parts of shoes comprising reinforced areas. Such stiffening can also be produced by placing a stiffening member, such as counters and box toes, in the proper area of the part between the absorbent layer and the backing layer prior to application of the high-frequency heating and pressure to produce a composite structure with integrated stiffened portions.

It should be understood that the present disclosure is for the purpose of illustration only and that this invention includes all modifications and equivalents falling within the scope of the appended claims.

I claim:

1. A method for making relatively thin parts with a predetermined surface configuration comprising confining a layer of compressible absorbent plastic material and a base plastic between a backing layer and a mold embodying the surface configuration to be reproduced, applying pressure and heat to cause the layer of compressible absorbent material and base plastic to become an integrated layer embodying said surface configuration bonded to the face of the backing layer and to conduct away the gases generated by such heating, allowing the plastic to stabilize and stripping the composite structure from the mold.

2. A method according to claim 1, comprising employing a mold comprising a material having a lower dielectric constant than the plastic material and effecting heating in a high frequency field.

3. A method according to claim 1, comprising employing a mold comprised of a silicone rubber and effecting heating in a high frequency field.

4. A method according to claim 1, comprising placing the base plastic next to the surface of the mold cavity and the compressible absorbent material next to the surface of the backing layer.

5. A method according to claim 1, comprising employing a mold containing a mold cavity which has a lesser volume than the volume of the compressible absorbent material and the base plastic.

6. A method according to claim 1, wherein the compressible absorbent layer is comprised of a batt of thermoplastic fibers.

7. A method according to claim 1, comprising placing between the backing layer and the layer of compressible absorbent material a reinforcing layer of compressible absorbent material having a melting point higher than the melting point of the base plastic.

8. A method of making relatively thin parts with a predetermined surface configuration comprising confining a layer of compressible absorbent plastic material, a base plastic and a pigmented plastic compatible with the base plastic but of different color between a backing layer and a mold embodying the surface configuration to be reproduced with the pigmented plastic next to the surface of the mold, applying pressure and heat to cause the several layers to become an integrated layer embodying the configuration of the mold bonded to the face of the backing layer, said compressible absorbent plastic material conducting away the gas generated by such heating during integration, allowing the plastic to stabilize and stripping the composite structure from the mold.

9. A method of making relatively thin parts with a predetermined surface configuration comprising confining a layer of compressible absorbent plastic material and a base plastic containing in predetermined areas a lower percentage of plasticizer than other areas, between a backing layer and a mold embodying the surface configuration to be reproduced, applying pressure and heat to cause the layer of compressible absorbent material and base plastic to become an integrated layer embodying said surface configuration bonded to the face of the backing layer, said compressible absorbent plastic material conducting away the gases generated by such heating, allowing the plastic to stabilize and stripping the composite structure from the mold.

10. A method of making relatively thin parts with a predetermined surface configuration comprising confining a layer of compressible absorbent plastic material with a base plastic in the form of a paste (semisolid) between a backing layer and mold embodying the surface configuration to be reproduced, applying pressure and heat to cause the layer of compressible absorbent material and the base plastic to become an integrated layer embodying said surface configuration bonded to the face of the backing layer, allowing the plastic to stabilize and stripping the composite structure from the mold.

11. A method of making relatively thin parts with a predetermined surface configuration comprising confining a layer of compressible absorbent plastic material and a base plastic in the form of powder between a backing layer and a mold embodying the surface configuration to be reproduced, applying pressure and heat to cause the layer of compressible absorbent material and base plastic to become an integrated layer embodying said surface configuration bonded to the face of the backing layer, allowing the plastic to stabilize and stripping the composite structure from the mold.

12. A method of making relatively thin parts with a predetermined surface configuration comprising providing a mold with a cavity, the surface of which embodies the surface configuration being reproduced, spraying the mold cavity with a thin layer of plastic, confining a layer of compressible absorbent plastic material and a base plastic between the surface of the mold and a backing layer, applying pressure and heat to cause the layers of compressible absorbent material, base plastic and sprayed on layer of plastic to become an integrated layer embodying the surface configuration of the mold bonded to the face of the backing layer, allowing the plastic to stabilize and stripping the composite structure from the mold.

13. A method of making relatively thin parts with a predetermined surface configuration comprising confining a layer of compressible absorbent material comprised of PVC and a base plastic comprised of PVC between a backing layer and a mold embodying the surface configuration to be reproduced wherein the base plastic is first disposed in the mold cavity, the layer of compressible absorbent material is placed against the cavity over the base plastic disposed therein, the backing layer is superimposed on the layer of compressible absorbent material, pressure and heat are applied to cause the compressible absorbent layer and base plastic to become an integrated layer embodying said surface configuration bonded to the face of the backing layer whereupon the plastic is allowed to stabilize and the composite structure then stripped from the mold.

14. The method according to claim 13, comprising including a reinforcing layer of compressible absorbent plastic material which has a melting point higher than that of the plastic material between the backing layer and the compressible absorbent layer.

15. A method according to claim 13, wherein the base plastic is in liquid form.

16. A method according to claim 13, wherein the base plastic is powder in form.

17. A method according to claim 13, wherein the plastic is in paste (semisolid) form.

18. A method according to claim 13, wherein predetermined portions of the base plastic within the mold cavity contain a greater amount of plasticizer than others.

19. A method according to claim 13, comprising depositing a pigmented plastic compatible with the base plastic in certain areas of the mold cavity before depositing the base plastic in the mold cavity.

20. A method according to claim 13, comprising spraying the surface of the mold cavity with a liquid plastic prior to depositing the base plastic in the mold cavity.

21. A method according to claim 13, comprising spraying the mold cavity with liquid polyurethane before depositing the base plastic in the mold cavity.

* * * * *